(12) United States Patent
Nazarian

(10) Patent No.: US 9,610,854 B2
(45) Date of Patent: Apr. 4, 2017

(54) METHOD AND APPARATUS FOR INTEGRATED ELECTRIC POWER GENERATION, STORAGE AND SUPPLY DISTRIBUTED AND NETWORKED AT THE SAME TIME

(71) Applicant: Ashot Nazarian, Potomac, MD (US)

(72) Inventor: Ashot Nazarian, Potomac, MD (US)

(*) Notice: Subject to any disclaimer, the term of this patent is extended or adjusted under 35 U.S.C. 154(b) by 0 days.

(21) Appl. No.: 14/999,051

(22) Filed: Mar. 24, 2016

(65) Prior Publication Data

US 2016/0207410 A1    Jul. 21, 2016

Related U.S. Application Data

(62) Division of application No. 13/374,215, filed on Dec. 16, 2011, now Pat. No. 9,300,139.

(60) Provisional application No. 61/459,586, filed on Dec. 16, 2010.

(51) Int. Cl.
| | |
|---|---|
| *H02J 3/00* | (2006.01) |
| *H02J 1/00* | (2006.01) |
| *B60L 11/18* | (2006.01) |
| *H02J 3/32* | (2006.01) |
| *H02J 3/38* | (2006.01) |

(52) U.S. Cl.
CPC ....... *B60L 11/1838* (2013.01); *B60L 11/1805* (2013.01); *B60L 11/1811* (2013.01); *B60L 11/1861* (2013.01); *H02J 3/32* (2013.01); *H02J 3/382* (2013.01); *H02J 3/383* (2013.01); *H02J 3/386* (2013.01); *Y02E 10/563* (2013.01); *Y02E 10/566* (2013.01); *Y02E 10/763* (2013.01); *Y02E 70/30* (2013.01); *Y10T 307/344* (2015.04); *Y10T 307/696* (2015.04)

(58) Field of Classification Search
CPC ... H02J 3/32; H02J 3/383; H02J 3/386; Y02E 10/563; Y02E 10/763
USPC .......................................................... 307/23
See application file for complete search history.

(56) References Cited

U.S. PATENT DOCUMENTS

2003/0047209 A1* 3/2003 Yanai .................. H02J 3/32
                                                      136/244

* cited by examiner

*Primary Examiner* — Rexford Barnie
*Assistant Examiner* — Toan Vu
(74) *Attorney, Agent, or Firm* — Jonathan Grant; Grant Patent Services

(57) ABSTRACT

An electric power retention distribution cell apparatus and method of operation of the cell includes a rechargeable battery assembly, a bi-directional inverter and a switch control operatively connectable to an electric utility grid, an outside power charging supply and at least one end user wherein the cell is selectively switched between the electric utility grid and the battery assembly to supply electric power to the one or more end users. The cell is connected to the power charging supply for charging the battery assembly, and for dividing the battery assembly into groups of batteries for storage at a lower terminal output voltages of each group than the battery assembly output voltage when in use as the primary power supply. Electric power supply networks are also described for a utility hub network formed using two or more cells, and for a regional utility hub network formed using multiple utility hubs.

3 Claims, 12 Drawing Sheets

METHOD AND APPARATUS FOR INTEGRATED ELECTRIC POWER GENERATION, STORAGE AND SUPPLY DISTRIBUTED AND NETWORKED AT THE SAME TIME

CROSS-REFERENCE TO RELATED APPLICATION

This application claims the benefit of priority under 35 U.S.C. 119(e) to U.S. Provisional Application No. 61/459,586 filed on Dec. 16, 2010, the disclosure of which is incorporated herein by reference.

BACKGROUND OF THE DISCLOSURE

1. Technical Field

The present disclosure relates to systems for electric power generation, storage and distribution.

2. Description of Related Art

Current electric power generation and distribution is centralized. As such, large scale power generation and distribution lacks flexibility, resilience and is vulnerable to large scale blackouts and catastrophic regional emergences. These issues are recognized globally. Currently many governments (US, Japan, EU, etc.) are sponsoring long-term efforts to resolve these type of issues. The "centralized approach" is also very inefficient and costly, and hence not feasible, when it comes to energy generation and storage due to lack of a mature and cost effective technology for large scale applications. A key element in all possible solutions lies in the energy storage. Current storage technologies have limited application to electrical grid system storage because of their power limitations, low energy density, and high cost.

Issues of integrated electric power systems and generation, and electrical battery current regulation systems are known and described, for example, in U.S. Pat. No. 5,764,502 and U.S. Pat. No. 7,589,498 B2. A common and one of the oldest types of storage makes use of the lead acid battery technology. While it is used predominantly for cars, this technology is still evolving and continues to be used in a number of energy storage projects in the United States. Although lead acid battery technology has many advantages, its energy management capabilities are very limited due to a short life cycle, inconsistent energy delivery, and high maintenance cost.

A promising candidate for large scale energy storage applications is the sodium-sulfur battery technology which has been tested for electrical grid applications by, for example, the US Department of Energy. This battery has relatively higher power, energy density, and efficiency. However, it is not feasible for residential and commercial applications due to: (1) operational, safety, and maintenance requirements (operates at high temperatures about 300° C.); (2) high cost ($3,000 per kilowatt installed); and (3) the large amount of space it requires. By some estimates a 20 kW system may require a 30 square foot space. Therefore the application of known methods and systems is heretofore recognized as being limited and not applicable to residential/commercial use. (As used herein, "residential/commercial" means "residential and/or commercial.").

SUMMARY OF THE DISCLOSURE

The present disclosure describes a new cost effective and resilient power system that utilizes the electrical grid and renewable (photovoltaic, wind, etc.) energy generation in conjunction with battery based energy storage to provide comprehensive and cost effective energy solutions for residential and commercial use. The disclosure presents and describes distributed energy generation and storage using localized units/cells, and then, through an electrical grid, connecting these units/cells first into clusters and then into a large scale energy network. Advanced battery storage is used for full energy needs for numerous days. When not in use, the stored energy can be preserved.

In one embodiment of the disclosure, a novel apparatus structure and method is proposed for comprehensively addressing issues of localized power generation, storage, and distribution in a way that changes the entire approach and concept of having just centralized power generation and distribution. In another embodiment, solutions are provided for electric power generation, storage and supply for residential and commercial applications by implementation of the localized concept in conjunction with the use of electric vehicle battery technology that is readily available.

In one embodiment, the present disclosure utilizes novel connection configurations of used electrical car batteries that still have excellent performance for residential/commercial energy storage use. Electrical car batteries generally degrade during the years of service and become less efficient for meeting demanding requirements of the automobile industry, for instance, rapid acceleration with quick discharging and charging needs. For example, loss of 20% of the battery performance level may have significant impact on a vehicle's performance and safety. However; for the energy storage "static" use (e.g., a residential use) these batteries still retain much needed characteristics.

Additionally, using car batteries for energy storage in residential/commercial applications makes use of the higher energy densities of such batteries, as the auto industry continues to improve the stored energy per kg of weight factor to improve the distance a vehicle travels per single battery charge. This higher energy density makes for more compact residential storage units. The car industry is anticipating improvements in capacity of electric car batteries at about 8-10% each year. See, e.g., http://www.hybridcars.com/news/13-key-questions-and-answers-about-nissan-leaf-battery-pack-and-ordering-28007.html for a description of battery improvements in the context of hybrid cars. If the anticipated improvements are realized, this will further reduce battery weight and increase energy storage capacity. Thus energy storage capacity for the same size and weight can be expected to double in about 8 years. Accordingly, in another embodiment, the disclosure provides a distributed power storage and generation system with high performance and low energy storage cost by making use of these advancements of the electric car battery industry in utilizing the huge number of these car batteries which are available for recycling.

A method and a system are described for energy management by which energy is distributed and networked at the same time. This energy management encompasses the generation of energy when it is most cost effective, the storage of energy most efficiently, and the availability of this lower cost reservoir of energy for use when needed. The system described is the main power supplier to the end user during the electrical grid's high load times, and supplied power is replenished during the night, at the electrical grid's low load times. The system and its components combine two critical function-enablers: (1) the distributed character of power generation and storage using an electrical cell, and (2) the networking-integrating of all units/cells as a robust system. Furthermore, due to technological breakthroughs in the car battery industry, it is feasible to achieve all of the above-mentioned on a smaller localized scale (residential/commercial)

The various embodiments of the disclosed cost effective and less vulnerable integrated power systems are characterized in that each is created with no single point of failure. They are thus not only cost effective, but also are not vulnerable to a power failure or blackout of grid power. The system is replenishing, re-charging and storing energy from the grid during low-load (night) times, when grid electricity is less expensive and when renewable sources (e.g., hydro-electrical) are oftentimes able to generate a significant amount of the power requirement. (The words "energy" and "power" are used interchangeably herein). Also, the cell uses all other renewable energy (photovoltaic, wind, geo-thermal, etc.) generated on-site and stores that renewable energy for later use. "On-site" as used in this context means in the vicinity of the site of the cell or at a reasonable distance therefrom for transporting electrical energy from the renewable energy source to the cell site. This eliminates the need to send this surplus energy to utilities which requires additional systems and fees. The cell system is more self-sustained and independent, and can meet all energy needs of its end users including back-up power for emergencies. The "cell" referred to herein is an electric power retention distribution cell. For simplicity in the disclosure it is referred to simply as a "cell" with it understood that it is an electric power retention distribution cell that also functions to connect the components of the cell and connect the end users to one or more electrical networks.

In furtherance of these and other objects of the disclosure, there is provided a method for delivery of electric power to an end user, using a cell that comprises a battery assembly operably connected to a bi-directional inverter configured to invert AC power from an electric grid to DC power to the battery assembly, and for inverting DC power from the battery assembly to AC power for delivery of AC power to the end user, and a switch control for disconnecting the grid from the cell and from the end user at a first time set, and for connecting the grid to the cell and to the end user at a second time set, wherein the method comprises the steps of connecting the cell with series and parallel connections to the electric grid, and selectively connecting one of the cell and the electric grid as the electric supplier to the end user.

There is also provided a cell for selectively providing electric energy to an end user comprising a rechargeable stored DC energy storage assembly, a bi-directional inverter connected to the rechargeable energy storage assembly, and a switch control operably connected to the inverter, an electric grid and the end user, wherein the switch control is configured to connect electric grid energy for delivery to the energy storage assembly and to the end user starting at a first set time, and to disconnect the grid energy from the energy storage assembly and the end user, and connect the energy storage assembly to the end user, at a second set time.

There is further provided a regional utility network system for delivery of electrical energy to an end user comprising an electrical grid configured to supply electrical grid energy, a regional utility hub connected to the electrical grid for receiving and distributing the electrical grid energy from the electrical grid, a utility hub connected to the regional utility hub for receiving and distributing electrical grid energy from the regional utility hub, and a cell connected to the regional hub for receiving and distributing electrical energy to an end user, wherein the cell comprises an energy storage assembly for storing electrical energy, an inverter connected to the battery assembly for converting between AC and DC power, and a switch connected between the utility hub and the and the inverter unit for selecting between the electrical grid energy or energy from the energy storage assembly for delivery to the end user.

DETAILED DESCRIPTION OF EMBODIMENTS

Figure 1:
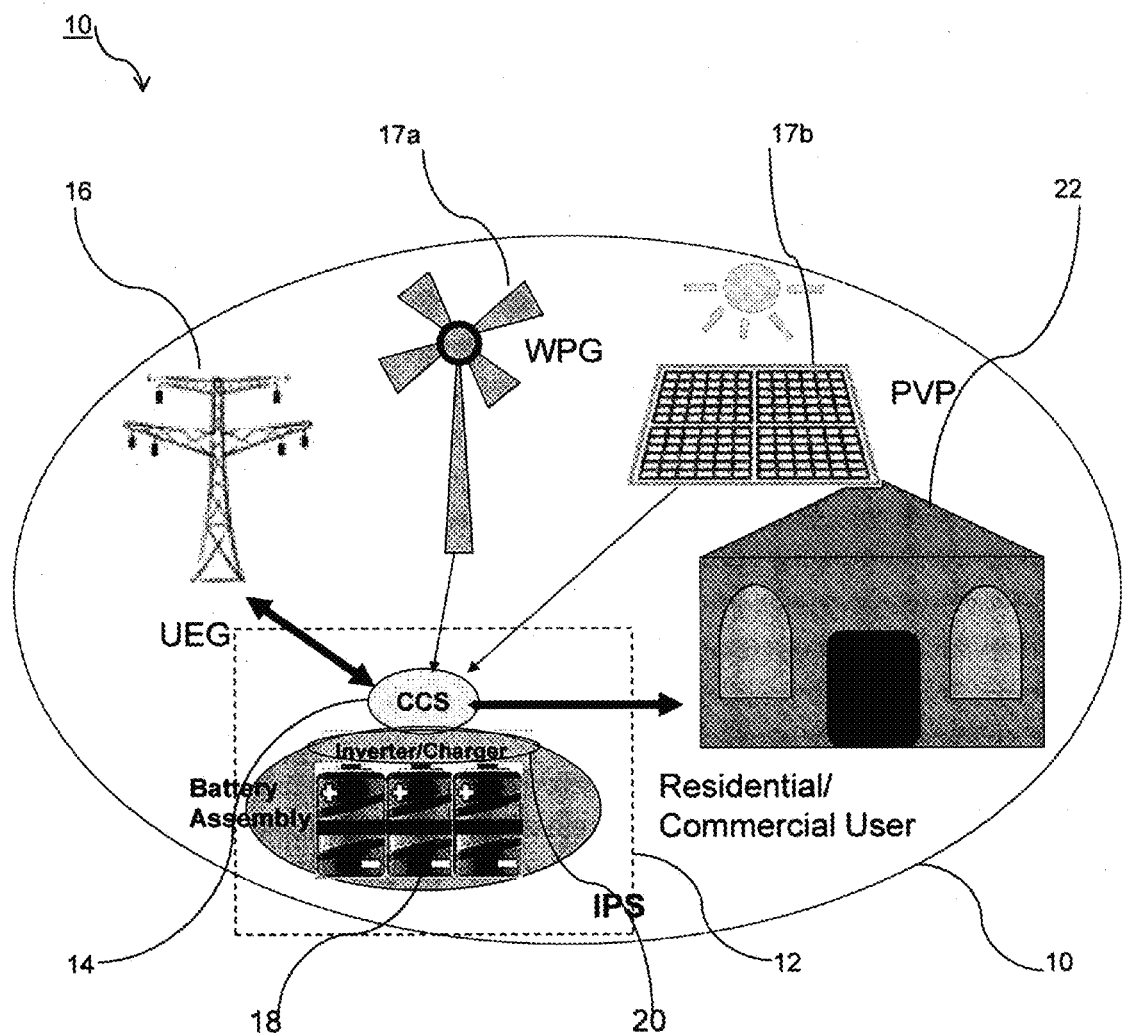
FIG. 1 is a pictorial illustration of an integrated power system using the unit/cell concept to integrate electric power storage and supply.

Embodiments of the present disclosure will be described in detail with reference to the drawings. In the drawings, parts that are the same or correspond to each other have been given the same reference signs, and redundant descriptions thereof will not be given.

A key element of the system is the use of electric car batteries at the end of their automotive life which can still have about 70 to 80% of their charging capacity when new. Unlike a battery's use in vehicles where conditions are fairly demanding with rapid discharging and charging, a residential/commercial use of the same battery gives the battery a "second life" once it is finished its automotive application. Use of "recycled" batteries also favorably adds to the cost/benefit of the system of the disclosure. The stored energy will meet full energy needs for days and when it is not in use, the stored energy can be preserved, nominally for up to a month, while also being available to meet any emergency back-up power situation.

Figure 2:
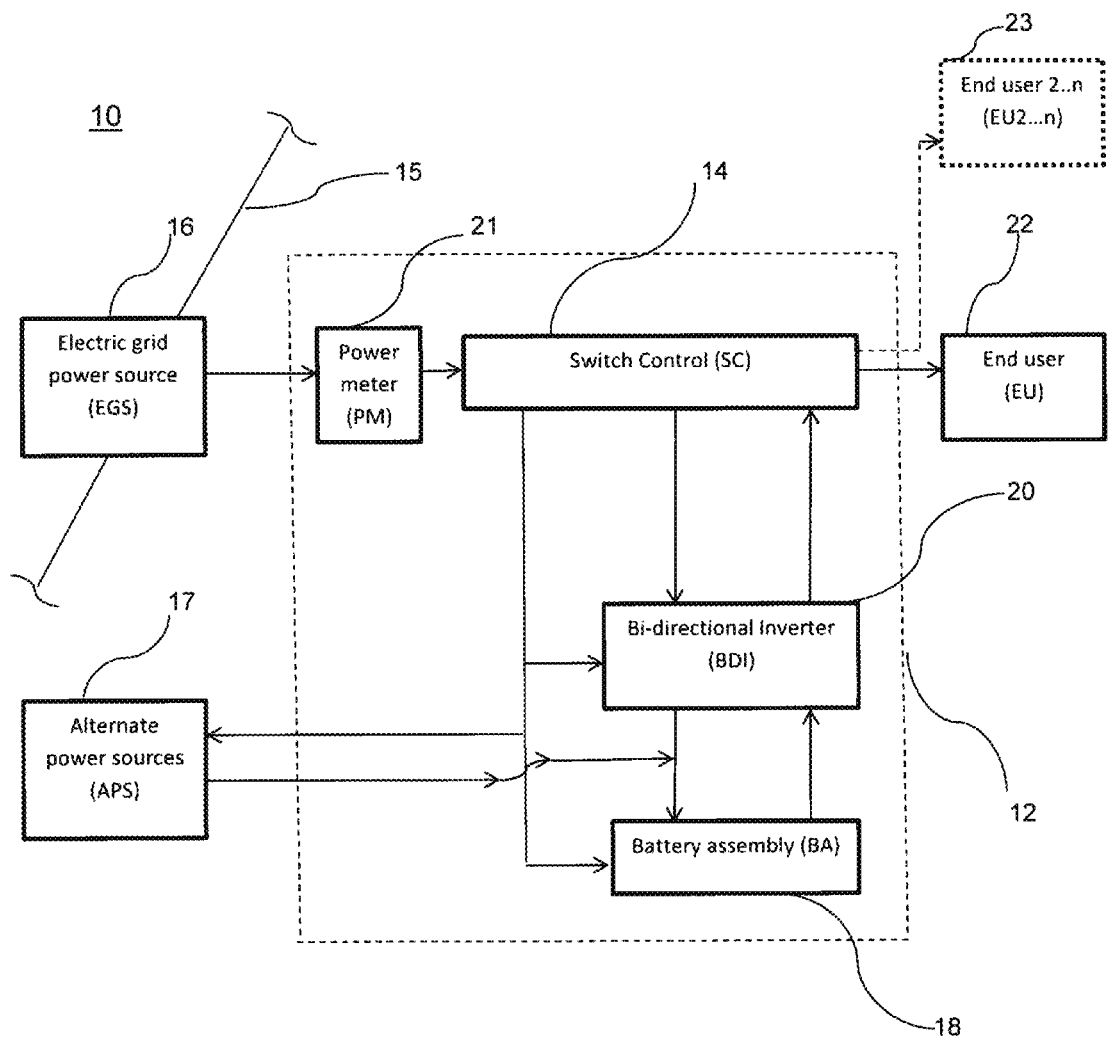
FIG. 2 is a block diagram of an integrated power system using the unit/cell concept to integrate electric power storage and supply.

Referring now to FIGS. 1 and 2, FIG. 1 is a pictorial illustration and FIG. 2 is a corresponding block diagram of an integrated power system (IPS) according to the disclosure using the unit/cell concept to integrate electric power storage and supply. The integrated power system 10 includes a "cell" (or "unit") 12 which contain a central control switch (CCS) 14 connected to an outside utility electric grid (UEG) 16, and a battery assembly 18 connected bi-directionally to an inverter/charger unit 20. Herein the central control switch is also simply referred to as "control switch" and the utility electric grid is at times simply referred to as the "grid." Inverter/charger unit 20 is connected also via a bi-directional link to central control switch 14. Inverter/charger unit 20 functions both as a bi-direction inverter and a charger to battery assembly 18, but is referred to herein simply as "inverter" 20. A power meter 21 is connected in series with switch control 14 to utility electric grid 16. As used herein, "units/cells" refers to a localized power storage, switching and distribution "unit" or "cell," one example of which is presented in FIGS. 1-2. The preferred term "cell" is predominately used herein for the localized power storage, switching and distribution system.

The central control switch is also connected to alternate energy or power sources 17 (FIG. 2), such as a wind power generator (WPG) 17a and/or a photovoltaic panel (PVP) 17b (FIG. 1) via one or more directional links to the alternate energy sources. The one or more alternate power sources delivery output power to the battery assembly of the cell. An appropriate interface (not shown) could be used with the battery assembly. As used herein, "energy" and "power", as in "energy source" or "power source" are used interchangeably. Central control switch 14 is also connected via one or more directional links to a residential and/or a commercial (residential/commercial) end user 22 of electric energy. Any number of end users could be connected to the cell as indicated by the dashed lines to end user 23 in FIG. 2. Although illustrated as a single additional end user 23, it is understood that end user 23 can represent any number of additional end users connected to cell 12.

Figure 3:
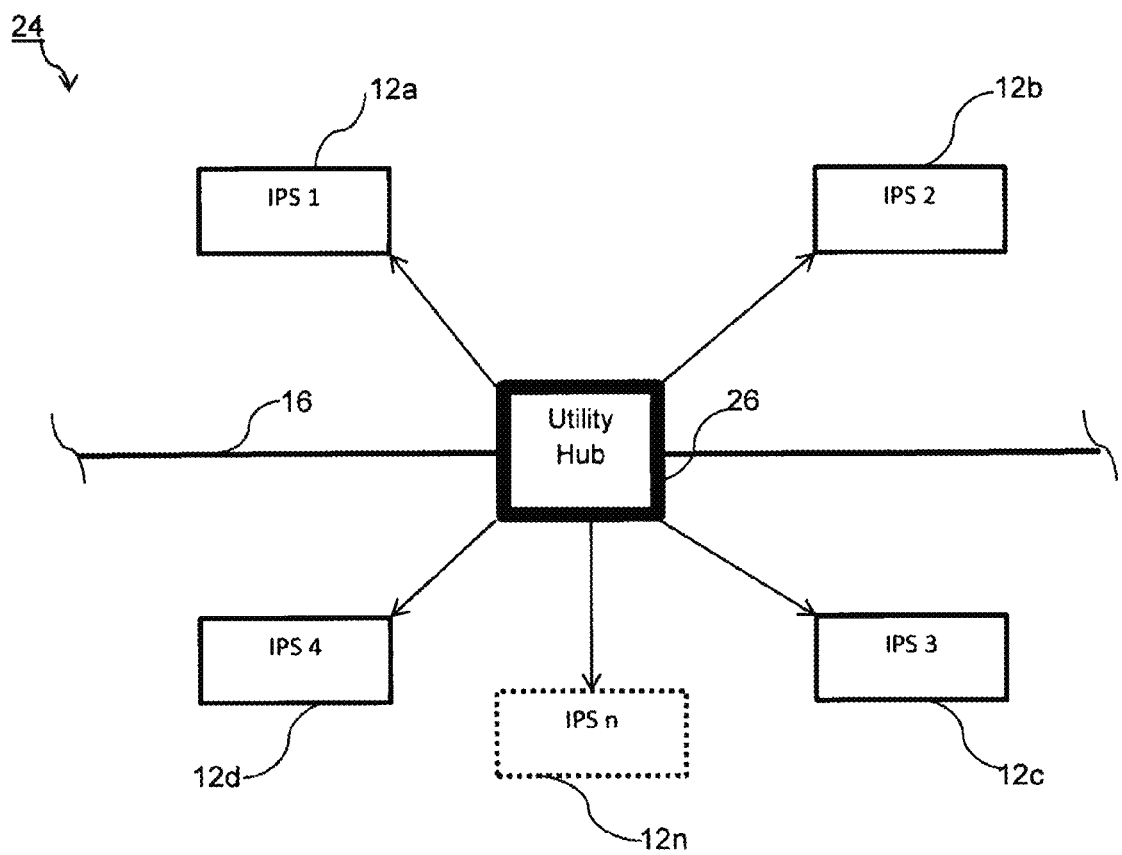
FIG. 3 is a block diagram of a cell cluster of an integrated power system formed by connecting multiple electric power retention distribution cells at a utility hub.

FIG. 3 is a block diagram of a cell cluster 24 of an integrated power system formed by connecting multiple electric cells 12a-12d at utility hub 26 which is connected to utility electric grid 16. FIG. 3 shows four distributed and independent units/cells 12 connected together at utility hub 26 to form the cluster; however the number of cells is not so limited. Any number of two or more cells could make up a cluster. There could be, for example, more than four cells, as indicated by the dashed line cell n designated in FIG. 3 as 12n. By utilizing one or more current utility grids, all units/cells are networked-integrated together.

Figure 4:
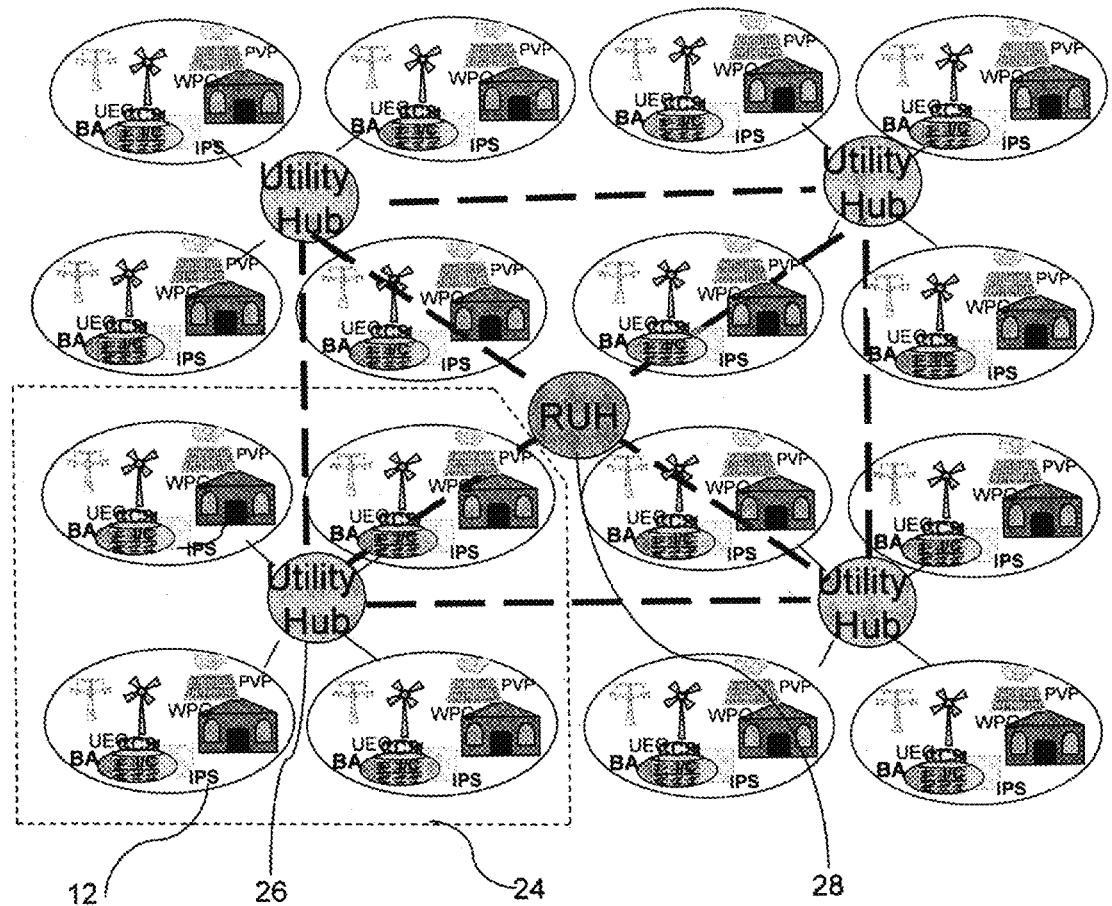
FIG. 4 is a pictorial illustration of a regional integrated power system formed by multiple cell clusters connected together at a regional utility hub.
Figure 5:
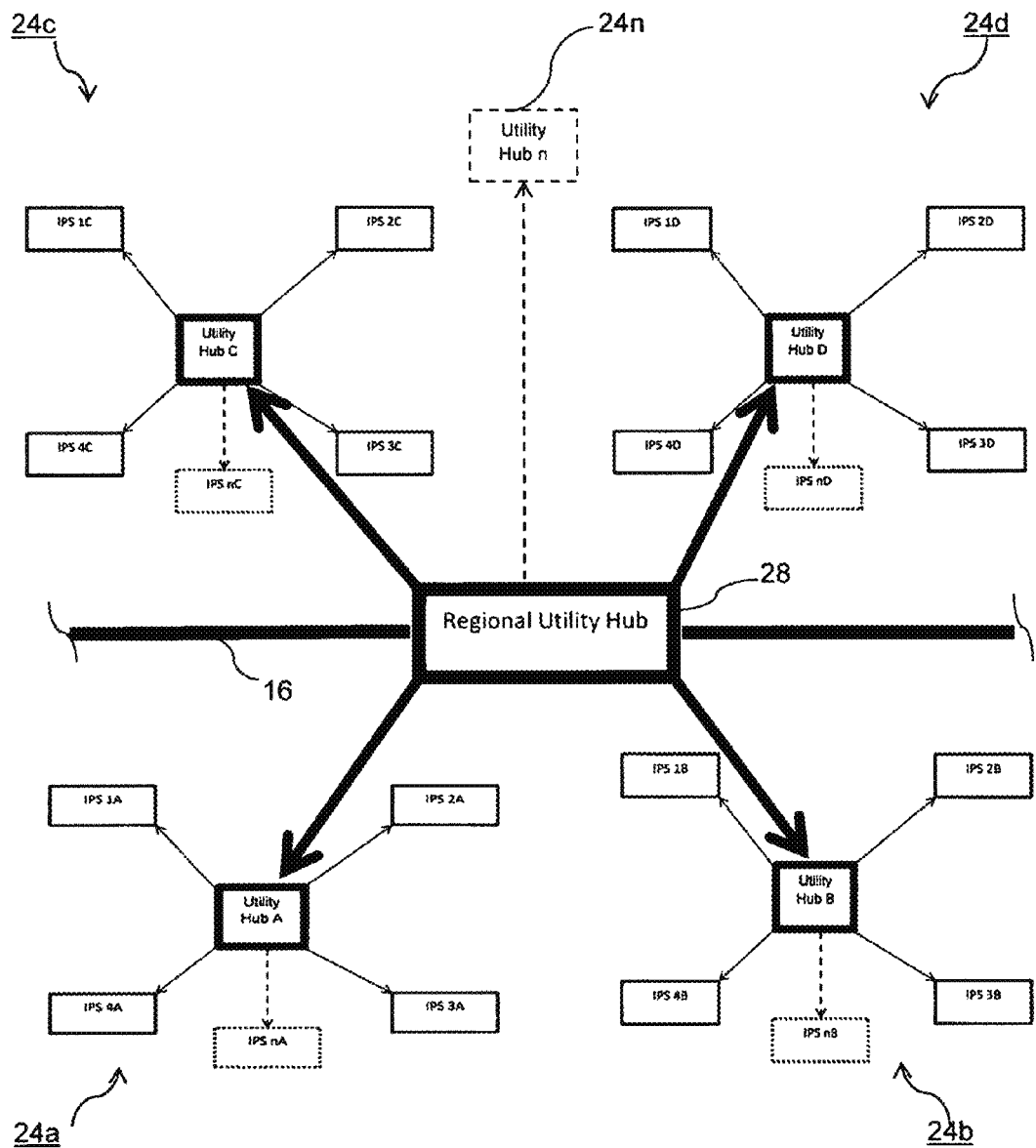
FIG. 5 is a block diagram of a regional integrated power system formed by multiple electric power retention distribution cells connected to utility hubs joined together at a regional utility hub.

Referring next to FIGS. 4 and 5, FIG. 4 is a pictorial illustration, and FIG. 5 is a corresponding block diagram, of a regional integrated power system formed by multiple cell clusters connected together at a regional utility hub. The embodiment of FIGS. 4-5 is a system arrangement for a regional utility network using clusters of cells connected together through utility hubs, and the utility hubs (A-D in the example of FIG. 5) joined at regional utility hub 28. The number of clusters joined together at a regional utility hub is not limited to four but can consist of two or more clusters. This is indicated in FIG. 5 by utility hub 24n to show that additional cell clusters can be connected to the regional utility hub. Although not illustrated, the same concept can be extended to a country-wide scale. Thus another embodiment of the disclosure is its application in providing a vast regional, or a country-wide, network by interconnecting two or more regional utility hubs together to form an integrated power system made up of individual, localized electric cells ("cells").

The described systems and components that center on the cell electric storage and distribution concept work in counter-phase with the utility electric grid's power demand. During the electrical grid's high load demand (usually during the day time), the cell supplies needed electrical power to a home or business by use of the stored DC voltage in combination with an inverter/charger unit that converts the DC power to AC. During the electric grid's low load demand (usually during the night time), stored electrical power in the cell is replenished also by use of the inverter/charger unit which converts AC power from the grid to DC to charge the batteries during night time when the electrical grid's load is usually low and the energy is less costly.

Figure 6:
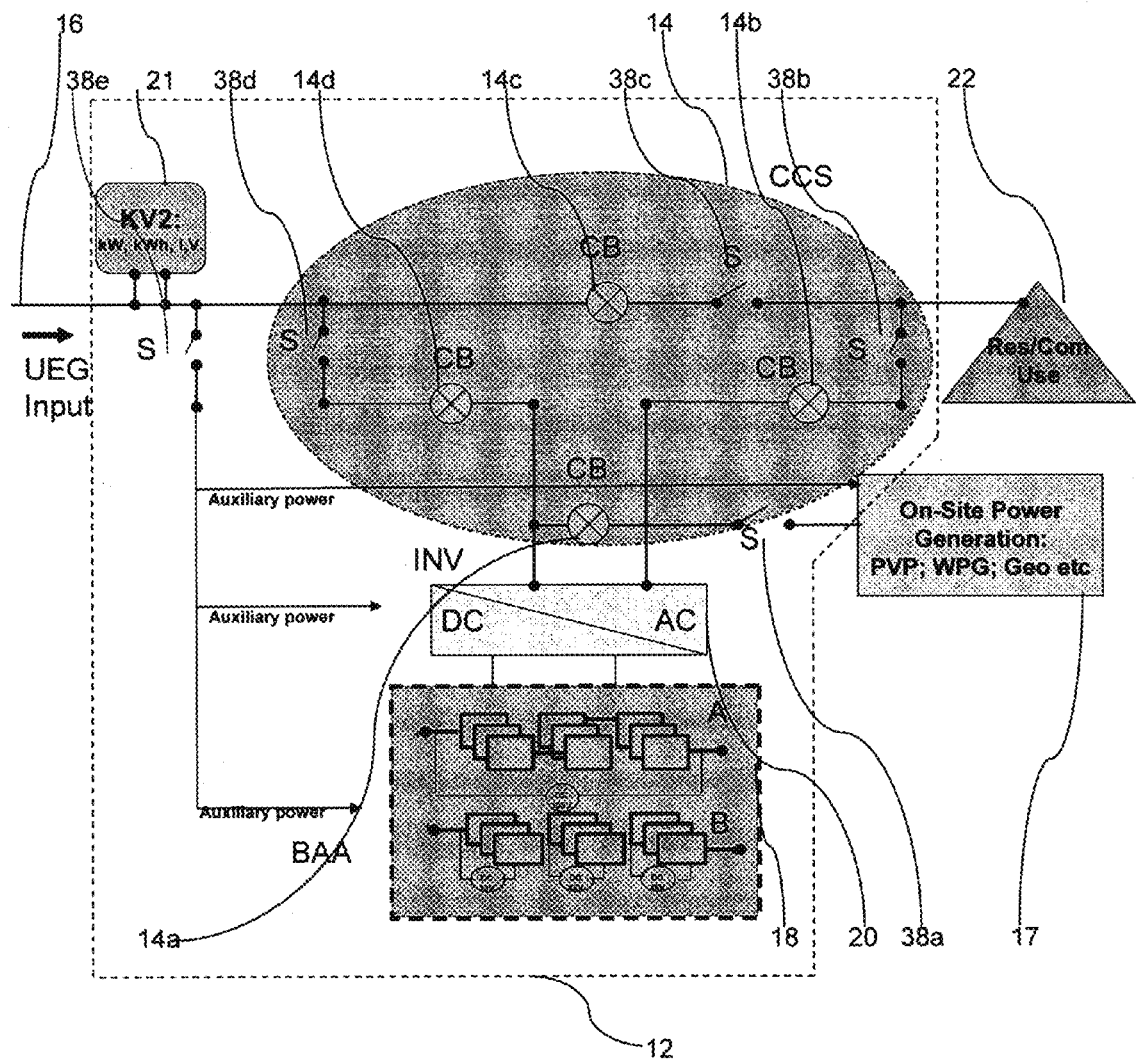
FIG. 6 is a schematic diagram of an embodiment for the electrical operation of an electric power retention distribution cell.

FIG. 6 is a schematic diagram of the electrical operational of a cell. FIG. 6 provides additional schematic details to the block diagram of FIG. 2. Where components in FIG. 6 are the same as in FIG. 2, those components are referenced by the same numbering used in FIG. 2. The cell has a battery assembly (BAA) 18, connected to a bi-directional inverter 20, which connects to central control switch 14. The bi-directional inverter is rated to handle power from 2.5 to 12 kW.

The central control switch includes four circuit breakers, 14a-14d. Circuit breaker 14a protects the circuit for delivery of electric power, when switch 38a is closed, from alternate energy source(s) 17 to the cell and to battery assembly 18. The power from alternate energy source 17 may be received at the cell as either AC or DC power. Hence, the power inputted through circuit breaker 14a is connected to inverter 20 for a determination of whether the received power is AC, and if it is, the AC is inverted to DC for delivery to the battery assembly. If the power received from alternate energy source 17 is DC, then it is delivered as input to the battery assembly without any inversion.

Circuit breaker 14b protects the circuit for delivery of AC electric power, when switch 38b is closed, from the inverter of the cell to the residential or commercial end user 22. Circuit breaker 14c protects the line for delivery of utility electric grid power 16 to the end user 22 when switch 38c is closed. Switch 38c would be closed when the utility electric grid is furnishing the primary electric supply to the end user. Switch 38c might also be closed to allow the grid to provide auxiliary power to the end user (e.g. for some controls) even when the cell is serving as the end user's primary electric supplier. In this case, the end user remains connected to the grid but uses much less grid power, namely only auxiliary power as needed. Circuit breaker 14d protects the circuit for delivery of utility electric grid power, when switch 38d is closed, to inverter 20 of cell 12, where the utility grid AC power is inverted to DC power and provided as a controlled DC power input to the battery assembly. Switch 38e is closed to supply auxiliary power, as needed, from the utility electric grid to alternate energy source 17 for on-site power generation, to inverter 20 which also functions as a battery charger to battery assembly 18, and to the battery assembly. An electric power meter (KV2-GE) 21 is used in the cell to monitor the operation by measuring standard parameters in the industry, such as power, voltage, and current. Meter 36 is connected in series or in parallel, or a combination thereof, with utility electric grid 16 as such connections are known in the industry.

Battery assembly 18 is a battery storage bank with an energy storage capacity of from 9.6 to 50 kWh. Batteries can be connected together by use of series battery connections, parallel battery connections, or a combination of series and parallel battery connections. For example, nine 12 VDC batteries can be connected in series to produce an output of 108 VDC that is inputted to inverter 20 for inversion to AC power. In another arrangement, a set of three 12 VDC batteries can be connected in series to produce an output of 36 VDC, and then three such sets be connected in series to also produce an output of 108 VDC.

In operation, the cell is set to time its connection and disconnection to the end user to supply and not supply, respectively, electrical power to the end user so to reduce or minimize electric power cost to the end user. For example, at a first predetermined time in the evening or night time (the first "set time"), the control switch 14 connects the cell to the grid (UEG) by closing switch 38*d*. This causes delivery of grid electric energy to inverter 20 which converts the AC grid power to DC and delivers DC electricity at the inverter's output to charge the batteries in the battery assembly. DC electricity is thus stored in the batteries of the battery assembly during the time that the cell is connected to the grid through switch 38*d*. At a second predetermined time in the morning (second "set time"), with the batteries in the battery assembly being fully charged, control switch 14 disconnects the grid by opening switches 38*c* and 38*d* and connects (in series) the cell to the end user by closing switch 38*b*. In this stage, the cell is the main energy supplier to the end user, as DC power stored in battery assembly 18 now flows to inverter 20 where it is converted to AC power and delivered through closed switch 38*b* to the end user 22. In this situation, switch 38*c* can optionally also remain closed to provide auxiliary power to the end user if desired.

In case of equipment failure or battery depletion (detected by appropriate monitoring devices, not shown), the control switch connects the grid to the residence or commercial entity and restores regular grid power supply to the end user by closing of switch 38*c* and opening of switch 38*b*. During the day and/or night, the cell, and specifically its battery assembly 18, can also be charged by using available alternative energy sources 17, such as solar (photovoltaic cells), wind, or geothermal power generators, by closing switch 38*a*. These alternative energy sources are referred to as "on-site power generation," which encompasses alternate power generation sources in the vicinity of the cell or within a reasonable power transportation distance to the cell. Switch 38*e* may be closed during either or both of the first and second set times to provide auxiliary power from the grid to the on-site power generation of the alternate energy source, which may consist of one or more alternate energy source, to the inverter 20 and to battery assembly 18.

The control switch and its individual switches may be controlled by a microprocessor, a computer, or by other automated devices. For example, an operator could input into a computer desired first and second set times for designating when the grid or the cell is to be the primary electric supplier to the end user.

It is understood that, although not shown in the figures, standard electrical meters, using either a series or parallel connection as appropriate, circuit breakers, and other devices as used in the delivery and receipt of electrical power could be included in the schematic circuit diagram of FIG. 6 and in connecting the cell to other parts of the described integrated power system.

Battery Configuration

Figure 7:
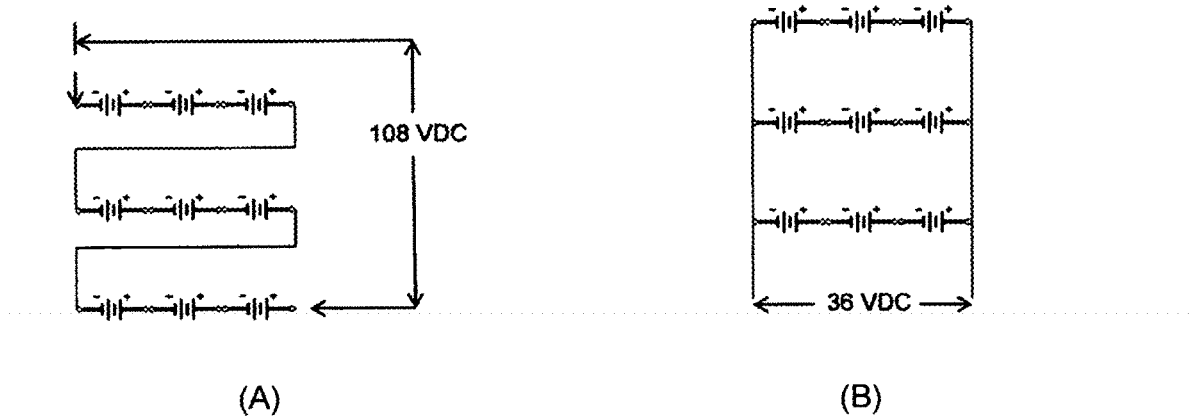
FIG. 7 shows circuit diagrams of series and parallel battery connections.
Figure 8:
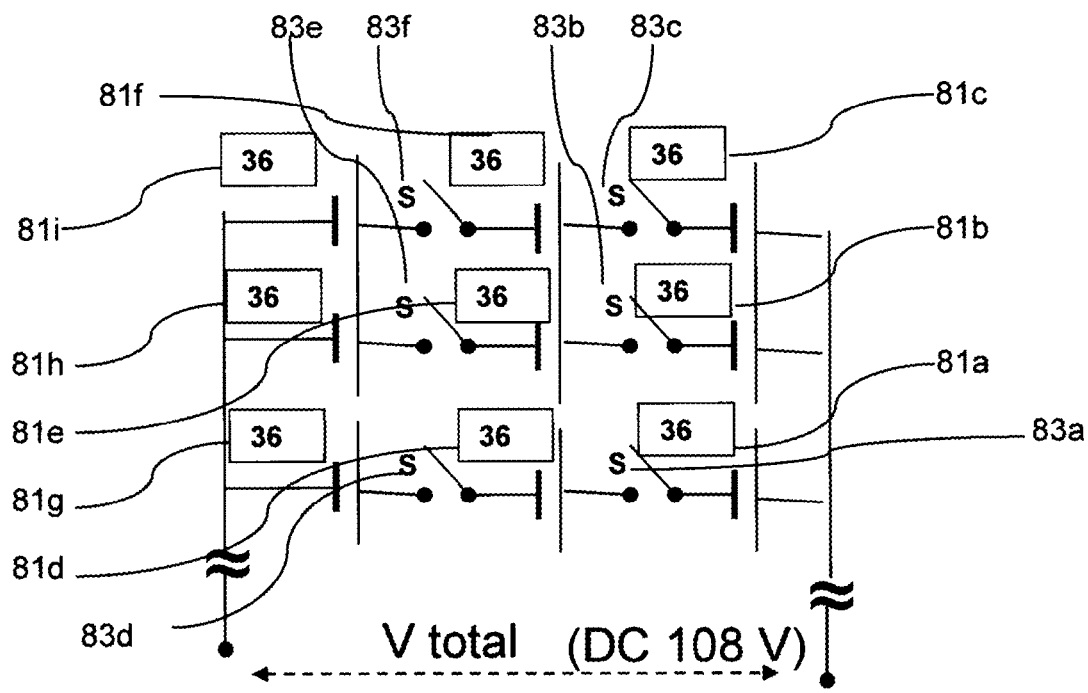
FIG. 8 is a circuit diagram of a battery configuration in one embodiment of the battery assembly.

Battery assembly 18 stores the electrical energy of the cell for distribution to one or more end users at preselected times. FIG. 7 shows the basic arrangements for series and parallel connections of multiple batteries. FIG. 7(A) is a circuit for a series connection of nine 12 volt (12 VDC) batteries to give an output voltage of 108 VDC. FIG. 7(B) is a circuit for a parallel connection of three sets of three 12 volt batteries connected in series to give an output voltage of 36 VDC. FIG. 8 is an illustration of one embodiment of a battery arrangement in the battery assembly. The figure shows a battery scheme that utilizes a combination of series and parallel battery configuration, similar to FIG. 7(B), in connecting battery configurations 81*a* through 81*i* as indicated by the circuit of FIG. 8. Each battery configuration designated as 81*a* through 81*i* consists of three 12 VDC batteries connected in series so that each configuration provides 36 VDC of voltage across its outputs. For simplicity, the three series-connected batteries in each configuration are not individually shown and instead are represented by the respective blocks 81*a* through 81*i*. Relay switches (S) 83*a*-83*f* are added in the circuit as indicated in FIG. 8 and function to disconnect certain of the batteries 81*a*-81*i* as illustrated in order to store and preserve energy for a longer period of time (nominally for up to a month), and to connect the batteries when the stored energy is used as the primary power supply to the end user. In the battery arrangement circuit of FIG. 8, the voltage at the output terminals of the battery assembly 18 (FIG. 6) with relay switches 83*a*-83*f* closed is 108 VDC. The voltage level at the output of battery assembly 18 can be achieved by use of different battery connection configurations. The battery scheme of FIG. 8 is shown as one embodiment of a battery arrangement.

Figure 9:
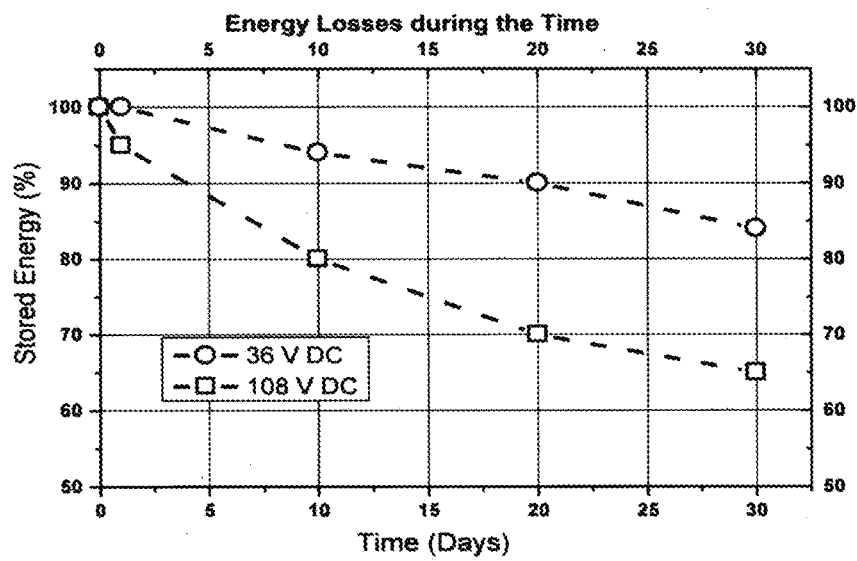
FIG. 9 is a notional chart showing stored energy depletion over time for different battery voltages.

Turning next to FIG. 9, a notional chart is presented of stored energy depletion over time for different battery voltages of 36 VDC and 108 VDC. The two energy depletion graphs in FIG. 9 are for demonstration purposes, that is, they are based on predicted figures. Energy leaks that cause energy depletion for a given voltage depend on a number of factors. There are internal leaks, leaks though air (due to humidity, temperature, temperature cycling, etc.), and surface leaks (due to moisture, dust deposits, temperature, etc.). Each of the factors will depend on actual battery types, assembly configuration and voltage. For example electric car battery assemblies usually operate at higher voltages (e.g., 300-440V). At the higher voltages external leaks in real-word conditions can increase significantly during the time. FIG. 9 gives an estimated predicted performance of battery energy storage using assumptions to approximate real world conditions made for various internal and external battery leakage factors. The graphs show greater stored energy depletion over 30 days when the battery level is stored at 108 VDC and a lesser depletion, hence more favorable results, when the battery level is stored at the lower 36 VDC.

Electrical use for U.S. households is 110 VAC. The use of an inverter to convert DC voltage to AC voltage, and the use of transformers to increase or decrease voltage to match residential/commercial use create additional energy losses. Having a minimal difference in the level of the inputted DC voltage to an inverter from the desired output AC voltage is beneficial in that it minimizes energy loss in the inversion process, and thus matching the input/output voltages is most desirable. Optimal results are therefore realized with a 108 VDC output from battery assembly 18.

However, to store energy in batteries for a long time (e.g., 30 days) and decrease energy losses during this time due to "leaks" (e.g., surface/air discharge and self/internal discharge), a lower voltage (than 110 VDC) will help greatly to preserve the energy, as FIG. 9 shows. Thus, to decrease losses during storage, storing the batteries at the more favorable 36 VDC level, as is accomplished by the circuit of FIG. 8, will extend energy storage over time when the cell is not in use. The design in one embodiment utilizes the combination of series and parallel battery configurations as shown in FIG. 8 where the S-relay switches selectively disconnect batteries in order to store and preserve energy for the longer time of up to a month.

Figure 10:
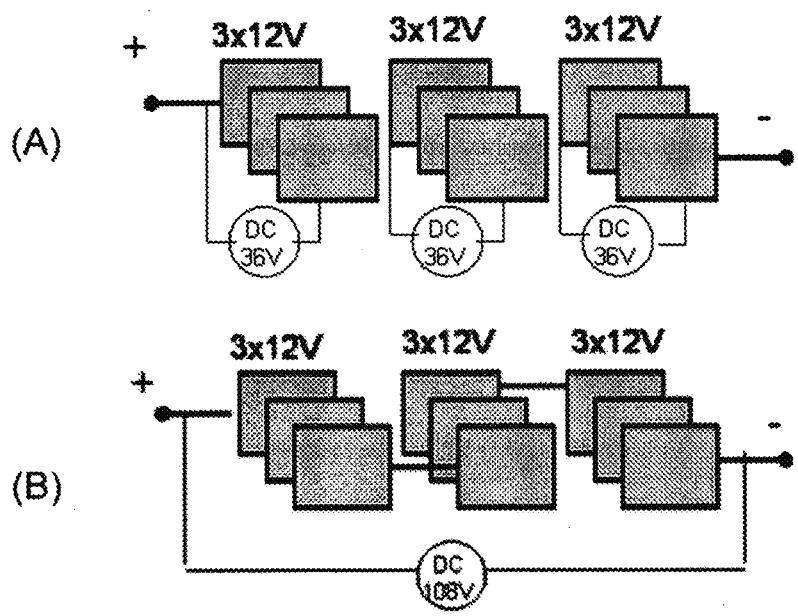
FIG. 10 is an illustration of battery configurations used under test.

Test Description:

Two sets of batteries, each consisting of nine 12 v batteries, were assembled as shown in FIG. 10. In the first set (FIG. 10(A)), only 3 batteries were connected in series to form a group, and the three groups were disconnected from one another. This formed three 36V DC units. In the second set (FIG. 10(B)), all batteries were connected in series to form a single 108 V DC unit. All batteries were charged to identical levels and then disconnected from the charger and kept in the same environment and conditions for 30 days. During that time measurements were taken of the stored energy in each set at the end of every 10-day period by measuring voltage and current. At the end of the 30-day period the 3 group 36 V batteries of the first set were connected in series to achieve 108V DC output unit, similar to that of the second set. Then, the total residual stored energy was measured in both sets. This allowed a comparison to be made of the performance for energy storage of the two sets of nine 12 V batteries. The test information that follows will show that actual tests conducted confirm the notional chart performance shown in FIG. 9.

Battery Assembly State of Charge Test Results.

Determining the State of Charge (SoC) of a battery is a key factor for battery quality control in all applications. SoC as an indicator of stored energy is measured using methods accepted by the industry. See, for example, "Methods for State-of-Charge Determination and their Applications", Sabine Piller et al., Journal of Power Sources, 2001, pp. 113-120. Long term energy storage testing typically uses type PS-1250 batteries. An exemplary SoC graph is presented in FIG. 11 which plots battery voltage as a function of its SoC in showing the relationship between a battery's open circuit voltage and its SoC. Use of this graph helps to accurately determine changes in battery electrical charge levels over time by measuring open circuit voltage. In view of this and other battery quality control advances, battery operation is currently changing to what could more accurately be called battery management than simply battery protection.

To determine the best battery configuration for the battery assembly 18 of cell 12, tests were conducted to determine the battery's retention of its electric charge using different configurations. SoC was measured for purposes of this disclosure using methods accepted by the industry.

A standard 12 volt, lead acid battery was used. Specifically the inventor used a "Power Sonic" battery model PS-1250F1 manufactured by Power-Sonic Corporation in San Diego, Calif., rated at 12 volt and 5.0 amp-hr. This specific type of battery was used for demonstration and proof of concept purposes. While the actual results (numbers of SoC) for metal ion batteries may vary, the concept for an optimal set of batteries as described will still apply.

Figure 11:
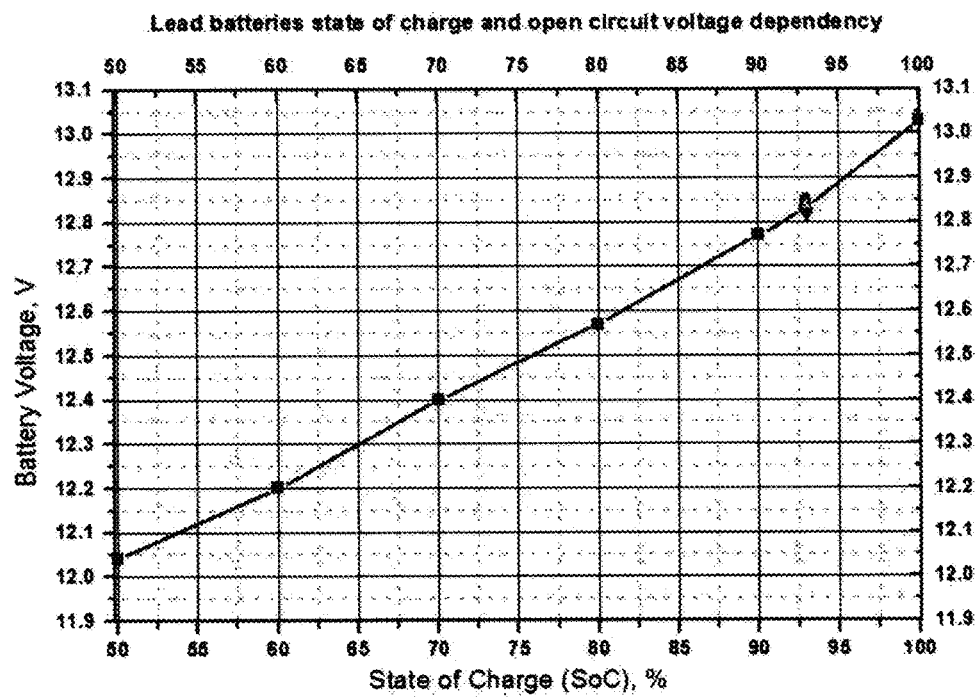
FIG. 11 is a graph showing battery voltage versus SoC from 50% to 100%

Two battery configurations were tested. In one configuration, nine 12 volt batteries were connected in series to give an output of 108 VDC, as illustrated in FIG. 10(B). In the other configuration, nine 12 volt batteries were connected in series in groups of three, and the three groups then connected in parallel, to give an output of 36 VDC of each group, as illustrated in FIG. 10(A). Both configurations (A) and (B) were left open circuited for purposes of the test. Each time each battery of FIGS. 10(A) and 10(B) was disconnected from any load for its SoC measurement, that it, an open circuit measurement was made. The test environment was controlled and maintained. The temperature was at 63 F, and humidity at 28-30%. The resulting plot of data is as shown on the graph of FIG. 11, which plots the open circuit voltage of the battery versus its SoC, where the data points are the average of the measurements made on each of the nine batteries. FIG. 11 shows that at the start point where the battery is 93% charged its starting voltage is approximately 12.85 VDC. As the battery charge decreases over time, its open circuit voltage decreases rather linearly down to approximately 12.05 volts at a 50% charge level (with appropriate extrapolation done on the graph).

The tests were conducted using three sets of battery assembly: set #1 consisted of nine 12 VDC batteries connected in series (FIG. 10 (B)) to give a nominal 108 VDC at the output terminals; set #2 consisted of three 12 VDC batteries connected in series in three groups, and the three groups were connected in parallel (FIG. 10 (A)) to give a nominal 36 VDC at the output terminals; set #3 was a control set consisting of one 12 volt battery.

Figure 12:
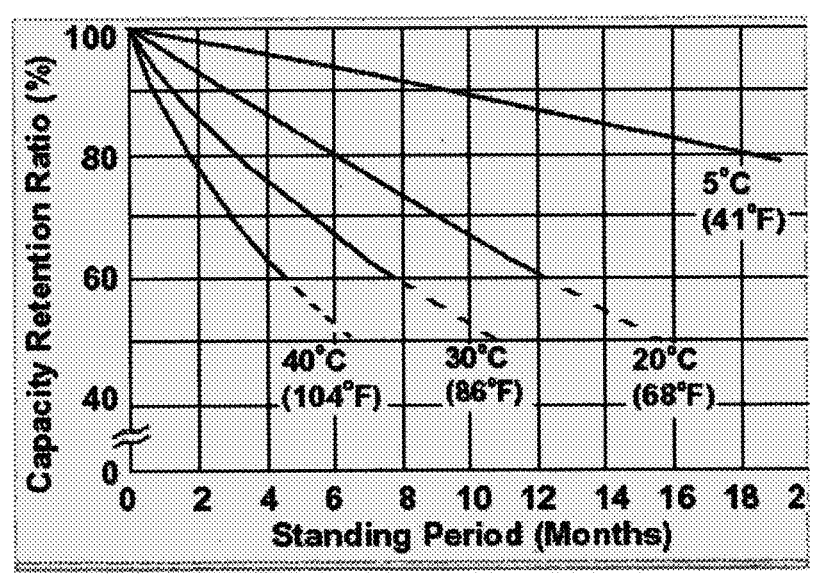
FIG. 12 is a graph of a manufacturer's data for battery capacity retention (%) over time.

FIG. 12 presents the manufacturer's data of its battery's capacity retention during the storage time standing period of from 0 to 20 months for different temperatures from 41 F-104 F.

Test Results

Figure 13:
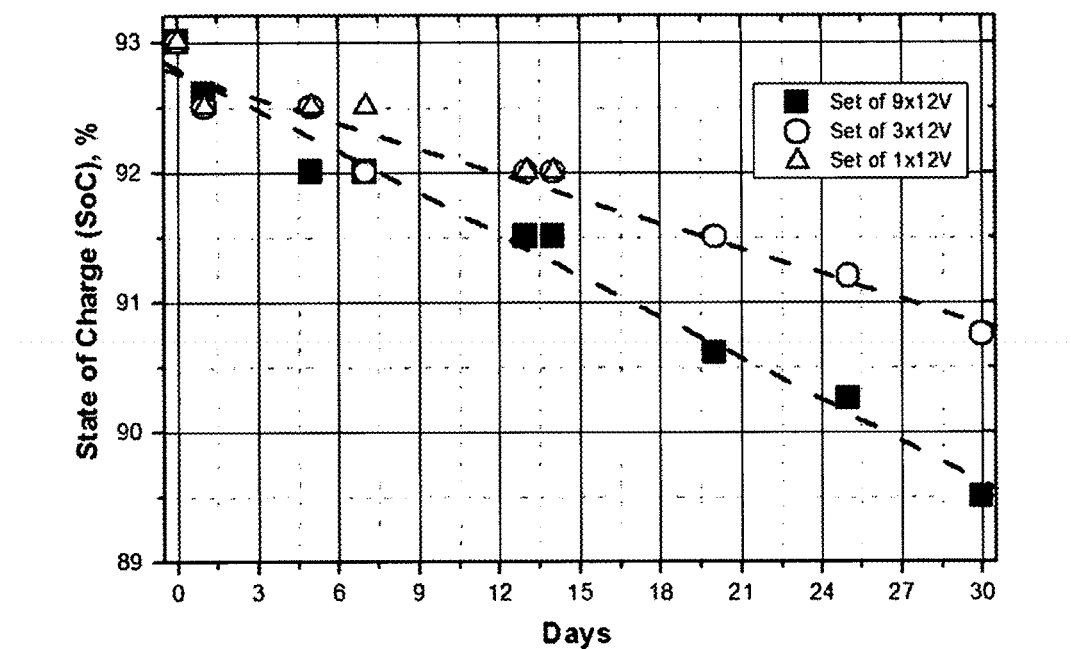
FIG. 13 is a graph of change in battery SoC over 30 days.

In "real-world" conditions and environment, energy stored in a battery can change/deplete due to internal leaks and external conditions (humidity, moisture dust, temperature, etc.). Internal battery leakage is recognized in the industry at about 5%. The external leakage can be studied ideally with control of outside factors, such as temperature, humidity, etc. External factors were controlled in the actual tests conducted the results of which are presented in FIGS. 13-14 and these confirm the predictions of FIG. 9. One set of actual test results are shown in the graph of FIG. 13, which plots data, again from the average taken of measurements at the output terminals of the three sets under test, SoC over a standing time of from 0 to 30 days. The test results show that there were appreciable differences in state of charge between battery assembly sets 1 (9×12V) and 2 (3×12V). However, there was no difference observed between set 2 (3×12V) and control set 3 (1×12V). The conclusion is that set 2 (36V) is optimal for longer term energy storage. The experiment proves that even in a well-controlled environment (best case scenario), stored energy will deplete differently based on the battery set configuration. In particular, the test confirms that it is important to disconnect units so to store the energy in the batteries at the lower (36V) DC voltage to achieve greater energy storage (less loss) for a longer period of time (30 days).

Figure 14:
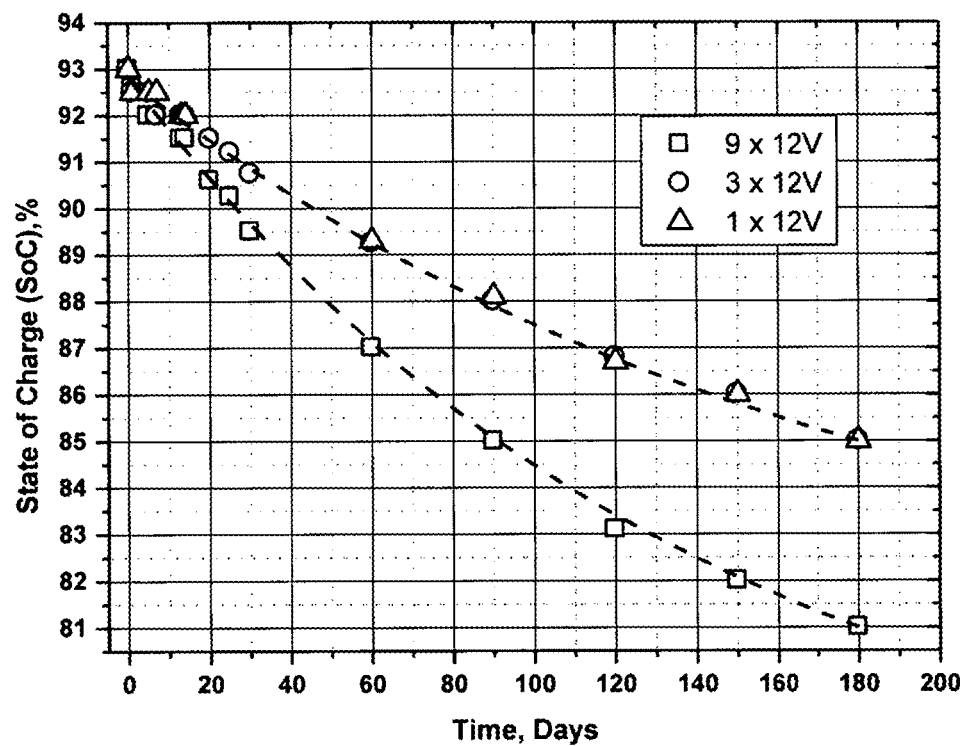
FIG. 14 is a graph of change in battery SoC over 180 days.

The same test was extended to a longer standing time (storage time) of 6 months, and the graph of FIG. 14 shows these results. This longer term test shows that sets #2 (3×12V) and #3(1×12V) after 180 days, have very similar states of charge, yet the SoC for set #1 (9×12V batteries) is much less. This is consistent with the results of the shorter 30-day storage time test. Both tests thus establish that by switching to 36V battery sets, these 36V sets will preserve stored energy on the same level as a single battery unit. The important lesson from the test is that, when in longer term storage, dividing the battery assembly into smaller open circuit voltages (⅓ of the total voltage to be used) will decrease the internal leak of energy from the batteries.

Figure 15:
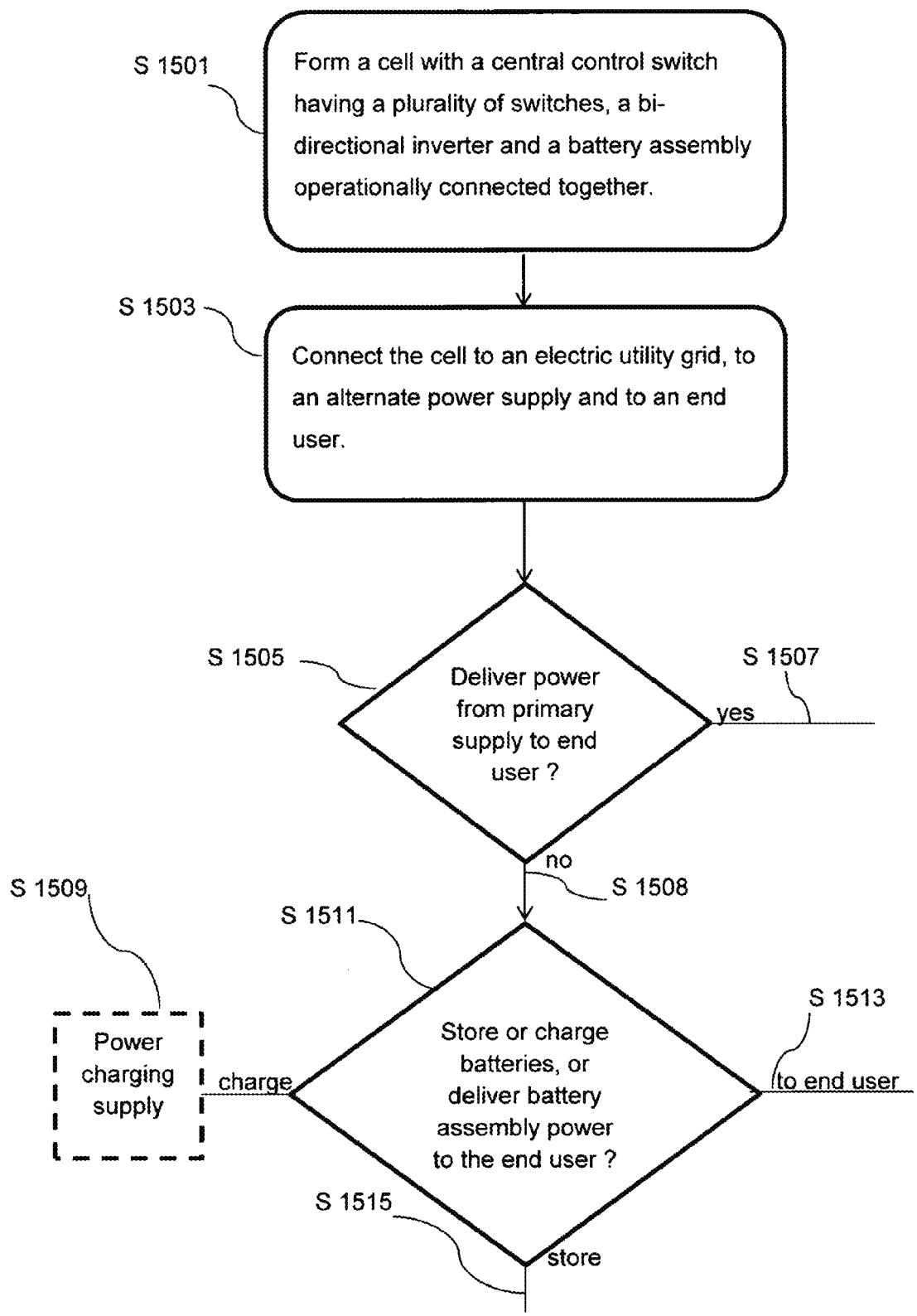
FIG. 15 is a flowchart showing a method of operation of a cell for delivering power to an end user according to one embodiment.

FIG. 15 shows a flow chart for a method of operating a cell for delivering power to an end user such as shown in the embodiment of FIGS. 2 and 6. In step S 1501, a cell is formed with a central control switch having a plurality of switches, a bi-directional inverter and a batter assembly operationally connected together such as, for example, shown in FIG. 6. In step 1503, the cell is electrically connected to an electric utility grid, to an alternate power supply and to an end user. The alternate power supply could be one or more alternate power supplies, such as generated by wind power, hydro-electric power or photovoltaic cells. The alternate power supply could be one or more of these combinations of alternate power supplies. The end use could be one or more end users of electricity.

In step S 1505, a selection is made as to whether or not to deliver power form the primary supply, which in this embodiment is from the electric utility grid, to the end user. If the primary supply or supplier is selected, the method proceeds to step S 1507 which connects to the end user. If the primary supply is not selected, the method proceeds to step S 1508 where another selection is made at step S 1511. Here the selection is whether to store the batteries, and specifically to store the charge of the batteries that make up the battery assembly, or to charge the batteries in the battery assembly, or to connect the battery assembly as the primary power supply to the end user. If the selection is to store the charge of the batteries in the battery assembly, an appropriate connection is made by the cell's central control switch to connect or disconnect selected groups of batteries in the battery assembly to the battery assembly's storage state, as indicated at step S 1515. It is understood that the central control switch can be connected to a computer or microprocessor for switch activation, and also that timers could be used to automate further the timing and manner in which the central switch control is to be operated.

If the selection is made to charge the batteries, then an appropriate switch control is activated to connect a power charging supply to the battery assembly to charge the batteries in the battery assembly as indicated at step S 1509. The power charging supply could include the electric utility grid power and/or power from other alternate power sources, such as wind and photovoltaic power sources as mentioned above. The alternate power sources or the electric utility grid power source can be used individually, in combination, or selectively along or in combination used any power charging supply. If the selection is to use the battery assembly as the primary power supply to the end user, the appropriate switching connections are made to connect the battery assembly to the end user as indicated at step S 1513. The cell's bi-directional inverter is used when charging the battery assembly from the power charging supply by inverting AC power to DC power for delivery to the battery assembly. The cell's bi-directional inverter is also used when the battery assembly is selected as the primary power supply to the end user by inverting the DC battery assembly power to AC power for delivery to the end user.

Figure 16:
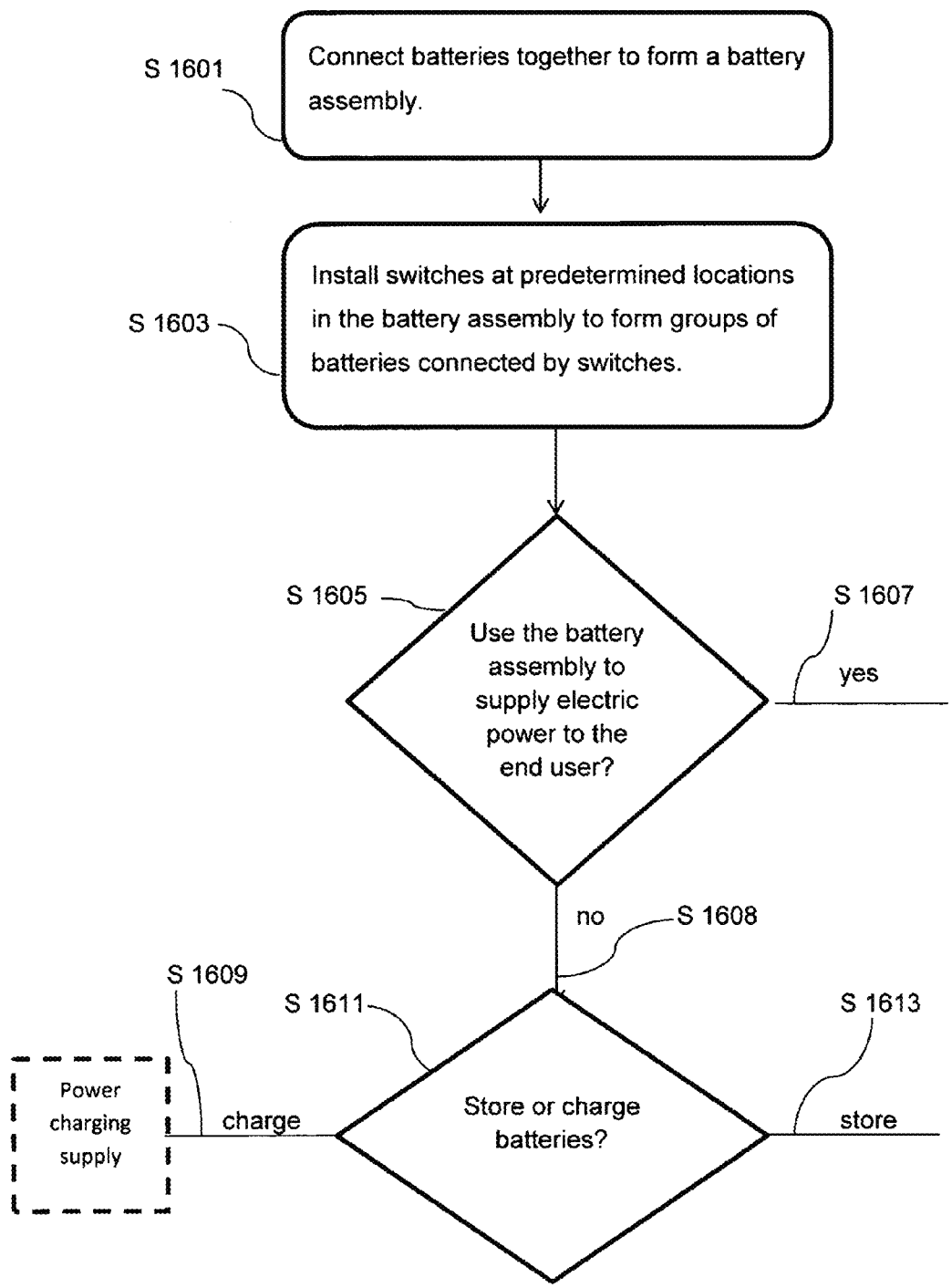
FIG. 16 is a flowchart showing a method of operating a battery assembly of a cell according to one embodiment.

FIG. 16 shows a flowchart for a method of operating a battery assembly such as used in an embodiment of the cell. In step S 1601, a battery assembly is formed by connecting batteries together. The connection could be a series connection or a parallel connection of batteries. It could also be a combination of series and parallel connections of groups of batteries. In step S 1603, one or more switches are installed at predetermined locations in the battery assembly so to connect and disconnect batteries or groups of batteries. For example, multiple series connections of batteries could form battery groups, and a switch or switches can be used to connect or disconnect the groups of batteries. In one embodiment, groups of batteries are disconnected by activation of the one or more switches when the battery assembly is in storage and not being used for delivery of power to the end user, and are connected by activation of the one or more switches when the battery assembly is being used for changing of the batteries from an outside power charging supply source, or for delivery of electric power to the end user.

In step S 1605, a selection is made as to whether or not the battery assembly is to be used to supply electric power as the primary supplier to the end user. If the battery assembly is selected to be the primary supplier, the battery assembly is appropriately switched so that the output of the battery assembly is connected to the end user, as indicated at step S 1607. The DC voltage of the battery assembly may be connected to an inverter to invert the DC voltage to AC voltage for delivery to the end user. Since the inverter is a component separate from the battery assembly, it is not shown in FIG. 16, but the line of S 1607 would connect to the inverter in routing the electric power of the battery assembly to the end user. It is understood that there could be more than one end user.

If the battery assembly is not selected to be the primary supplier, the battery assembly is appropriately switched so that the process proceeds, as indicated by step S 1608, to the next step S 1611 where a selection is made as to whether the battery assembly is to be charged or stored. If the battery assembly is to be charged, the battery assembly is appropriately switched to connect to an outside power charging supply as indicated at step S 1609. The outside power charging supply could be from alternate energy sources, such as photovoltaic cells, wind turbines or hydro-electric generators. The power charging supply could also be from the electric utility grid. Any one of these exemplary energy sources or any combination of alternate energy sources can be used as the power charging supply of FIG. 16 to charge the battery assembly. In one embodiment, the switching in of a power charging supply can be automated, for example by connecting a voltage level detector to the battery assembly, and when the voltage level at output terminals of the battery assembly drop below a preset level, then the battery assembly is automatically switched to connect to the power charging supply. In another embodiment, power from an alternate energy source, such as photovoltaic cells or wind turbines which generate electricity only in certain conditions (the presence of sunlight or wind, in the two examples given), could be connected to an energy storage device as part of the battery assembly. Such an energy storage device could be, for example, a capacitor or bank of capacitors, and the battery assembly then selectively connected to that energy storage device when the battery assembly is to be charged.

If the selection is made to store the charge of the batteries in the battery assembly, then the battery assembly is appropriately switched so that the outside power charging supply is not connected and the batteries are stored as indicated at step S 1613 in an open circuit state. In one embodiment, when switched to the storage state, one or more switches in the battery assembly are activated to groups of batteries connected together where each group has an output terminal voltage that is less than the output voltage of the battery assembly when all the batteries are connected together.

Note that the processes or method steps included in FIGS. 15 and 16 and the descriptive text associated therewith do not have to be performed chronologically in the order described in the flowcharts. Some of the processes may be performed in a parallel manner or may be performed as a sub-routine.

The disclosure explains how residential or commercial distributed generation and storage can be networked through utilities. This will ease the stress on electrical grid during peak times. Furthermore, if regulated and controlled correctly, use of the cell concept will provide much needed power storage ballast for the electric utility grid so to reduce or possibly eliminate crashes/blackouts. After scaling to a significant number of systems participating in the network (achieving a critical mass), the integrated and distributed character of this disclosure can at the same time add robustness and redundancy which can withstand large scale/regional emergencies. Hence, the residential/commercial power generation and storage capability is a critical enabler to achieve a robust and sustainable energy system. FIGS. 4-5, as previously discussed, presents an example of how distributed and independent cell sites can be used together to form a cell cluster through a utility hub, which can then connect to other clusters through a regional utility hub to create a regional or country-wide network. This concept allows localizing power emergencies/outages and eliminating a network-wide cascade/domino effect by restricting any such adverse event to a predefined regional level.

The embodiments disclosed in this application are to be considered in all respects as illustrative and not limiting. The scope of the disclosure is indicated by the appended claims rather than by the foregoing description, and all changes which come within the meaning and range of equivalency of the claims are intended to be embraced therein.

The invention claimed is:

1. A method for supplying electric power to at least one end user using an electric power retention distribution cell that comprises a rechargeable battery assembly using used electric car batteries operably connected to a bi-directional inverter for inverting a first AC voltage from an electric utility grid to a first DC voltage to the rechargeable battery assembly, and for inverting a second DC voltage from the rechargeable battery assembly to a second AC voltage for delivery to the at least one end user, and a switch control for selectively controlling circuit connections of the electric power retention distribution cell, the method comprising the steps of:
   connecting the electric power retention distribution cell to the electric utility grid, to the at least one end user and to a power charging supply;
   providing at a first time set for the electric utility grid to be a primary electric supplier to the at least one end user;
   switching at a second time set for the electric power retention distribution cell to be the primary electric supplier to the at least one end user;
   charging the batteries in the battery assembly at a first predetermined time from the power charging supply; and
   storing at a second predetermined time an electrical power of the battery assembly at a third voltage different from the second DC voltage;
   wherein the storing of the electrical power of the battery assembly further comprises the step of:
   dividing the battery assembly into groups of batteries; and
   disconnecting the groups of said used electric car batteries from the battery assembly when storing the electrical power of the battery assembly, wherein at least one group is stored at the third DC voltage.

2. The method according to claim 1, wherein the second DC voltage is between 100 and 115 volts DC, and the third DC voltage is lower than the second DC voltage.

3. The method according to claim 1, wherein the charging of the used electric car batteries in the battery assembly comprises:
   converting electric power from the power charging supply from an AC voltage to a DC voltage; and
   inputting the DC voltage to a charger unit for supplying charging electrical power to the battery assembly.

* * * * *